Figures 1, 1A:
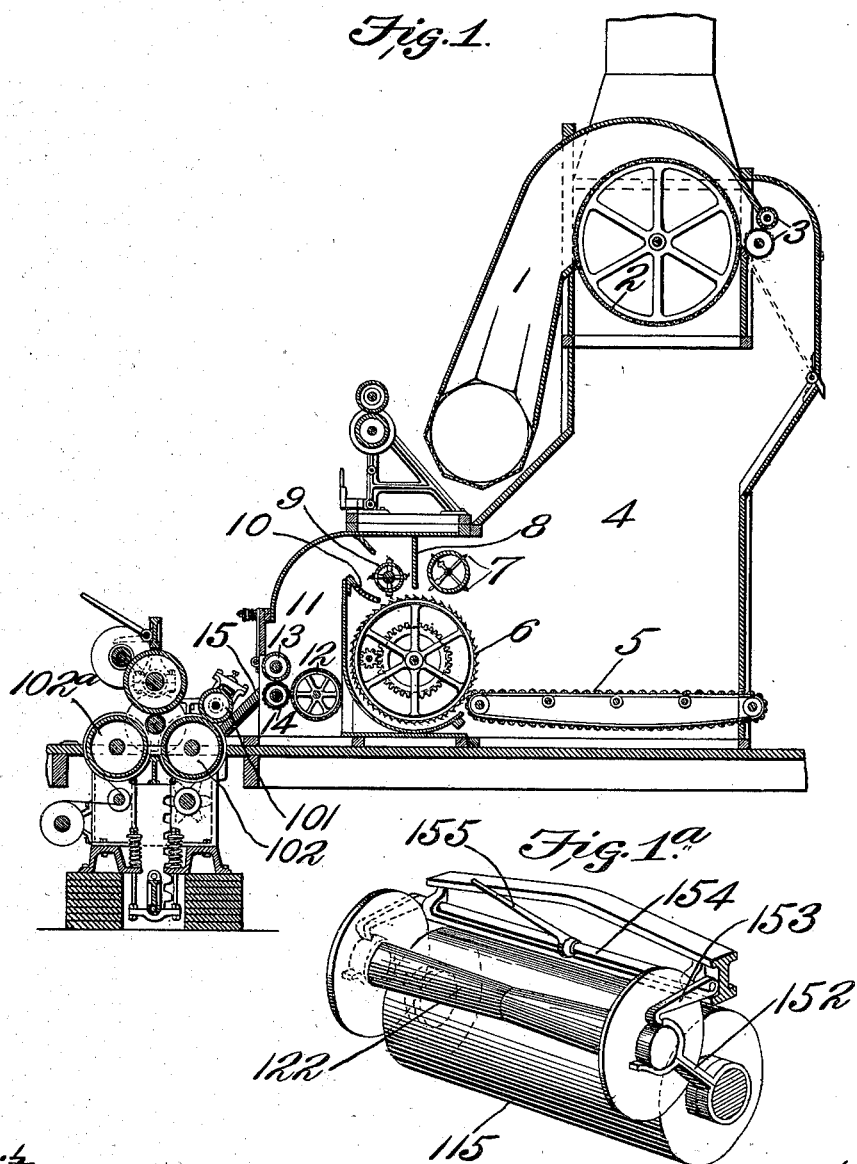

No. 731,882. PATENTED JUNE 23, 1903.
J. R. FORDYCE.
COTTON BALING APPARATUS.
APPLICATION FILED JUNE 18, 1902.
NO MODEL. 4 SHEETS—SHEET 1.

Witnesses:
Ralph M. Ashby.
G. A. Pennington.

Inventor:
John R. Fordyce,
by Bakewell Cornwall
Attys.

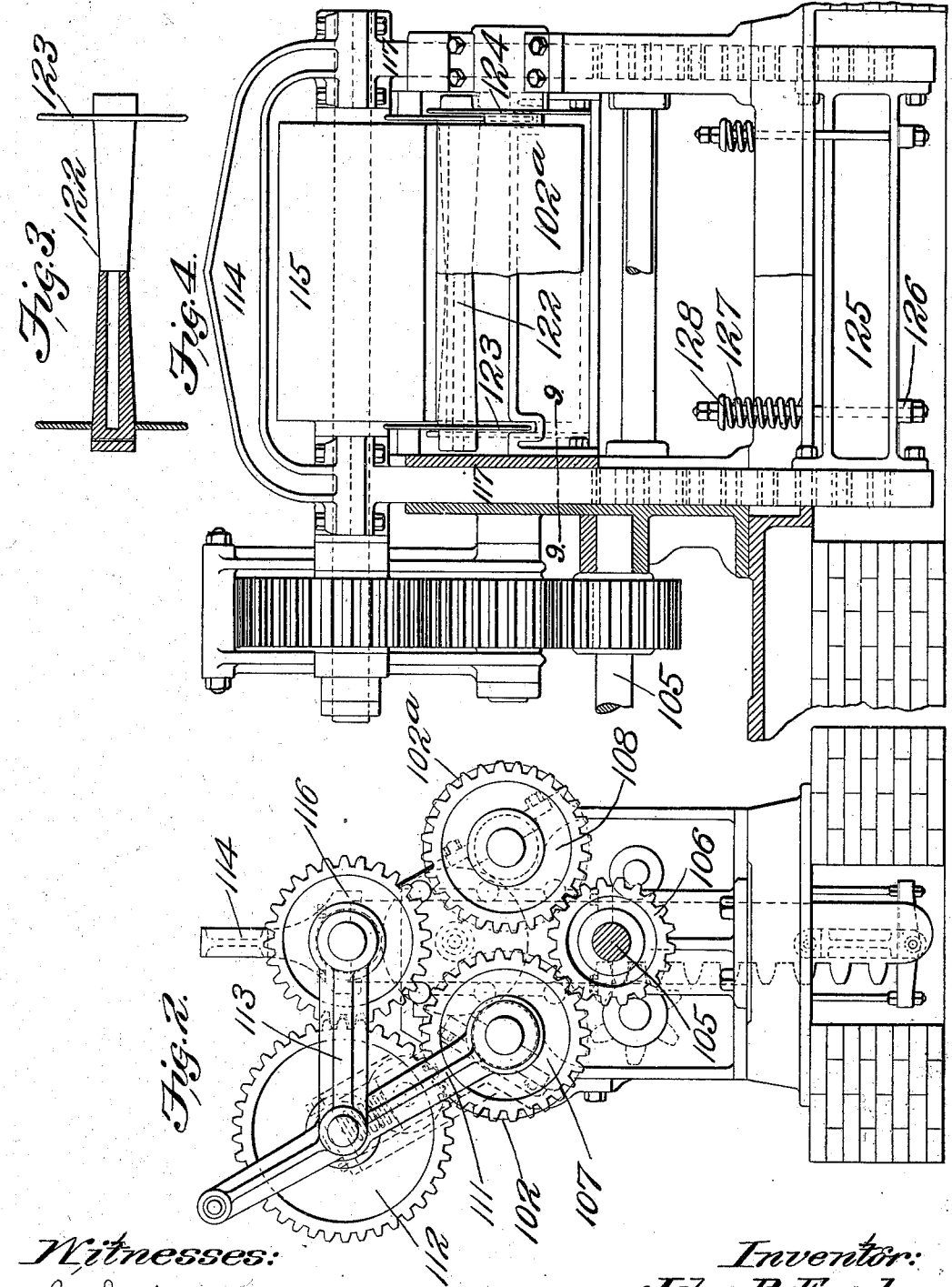

No. 731,882. PATENTED JUNE 23, 1903.
J. R. FORDYCE.
COTTON BALING APPARATUS.
APPLICATION FILED JUNE 18, 1902.
NO MODEL. 4 SHEETS—SHEET 3.
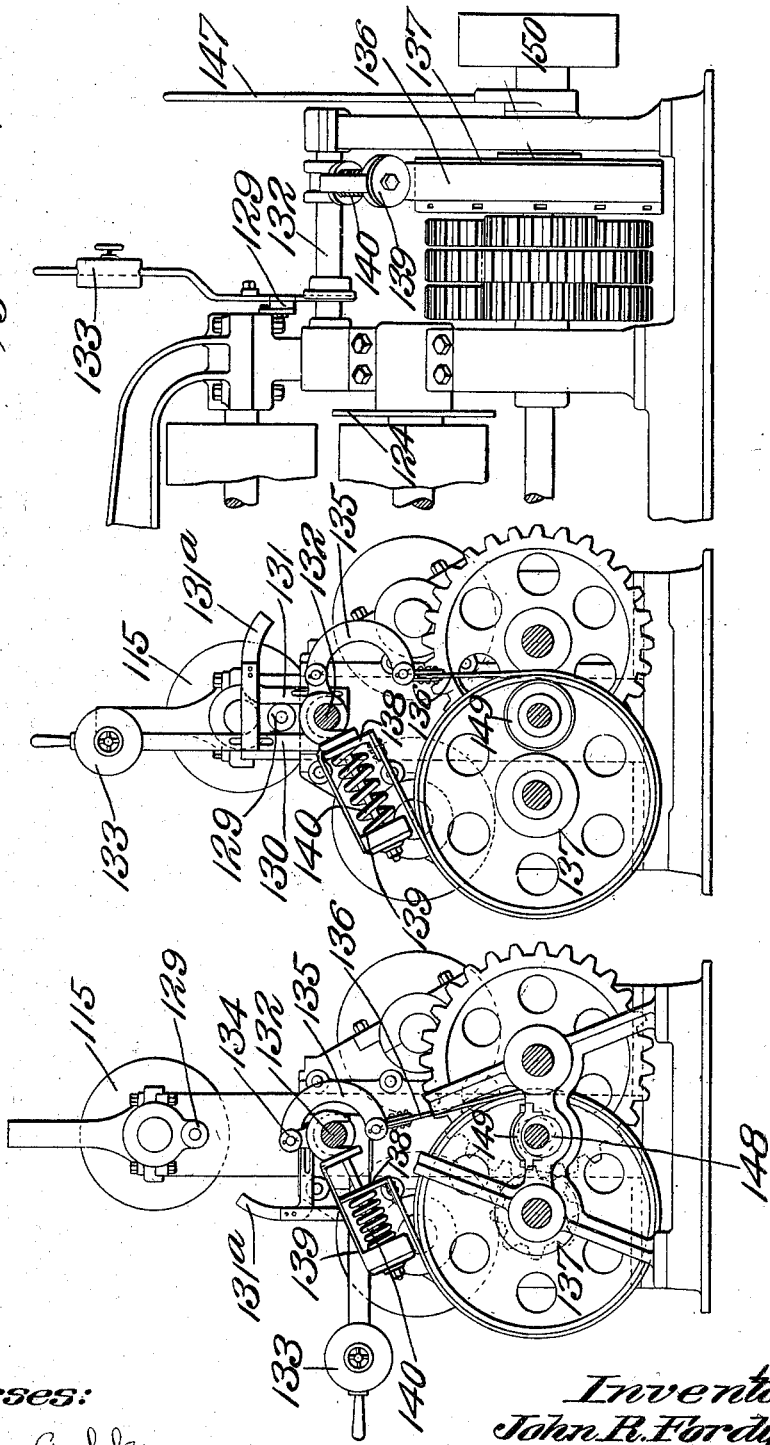
Witnesses:
Ralph M. Ashby.
G. A. Pennington
Inventor:
John R. Fordyce,
by Bakewell & Cornwall
Attys.

No. 731,882. PATENTED JUNE 23, 1903.
J. R. FORDYCE.
COTTON BALING APPARATUS.
APPLICATION FILED JUNE 18, 1902.
NO MODEL. 4 SHEETS—SHEET 4.
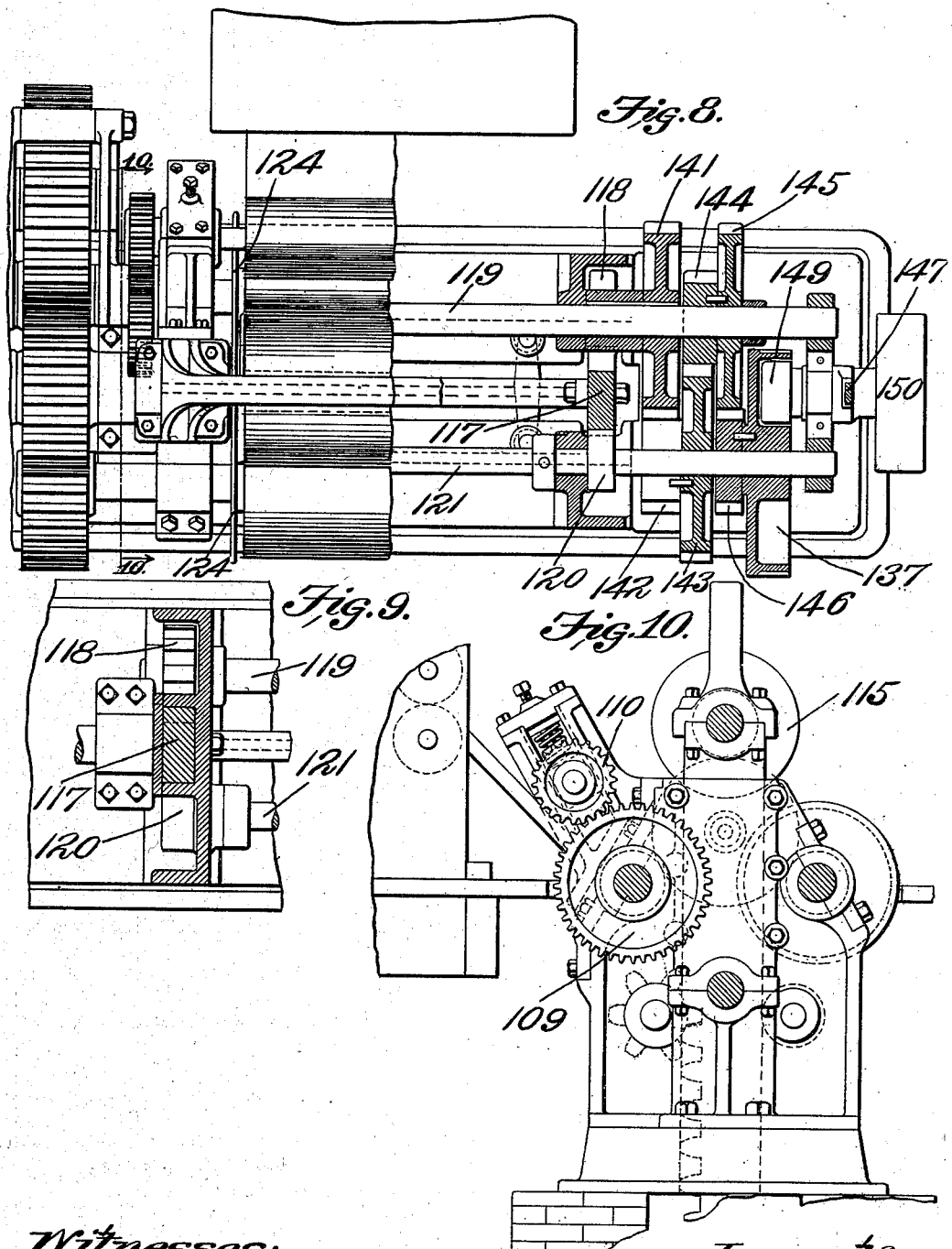
Witnesses:
Ralph M. Ashby.
G. A. Pennington.
Inventor:
John R. Fordyce,
by Bakewell & Cornwall
Attys.

No. 731,882.

Patented June 23, 1903.

UNITED STATES PATENT OFFICE.

JOHN R. FORDYCE, OF LITTLE ROCK, ARKANSAS.

COTTON-BALING APPARATUS.

SPECIFICATION forming part of Letters Patent No. 731,882, dated June 23, 1903.

Application filed June 18, 1902. Serial No. 112,217. (No model.)

*To all whom it may concern:*

Be it known that I, JOHN R. FORDYCE, a citizen of the United States, residing at Little Rock, Arkansas, have invented a certain new and useful Improvement in Cotton - Baling Apparatus, of which the following is a full, clear, and exact description, such as will enable others skilled in the art to which it appertains to make and use the same, reference being had to the accompanying drawings, forming part of this specification, in which—

Figure 1 is a vertical longitudinal sectional view showing my improved baling apparatus in position to receive a bat from an appropriate bat-forming mechanism. Fig. 1ª is a detail view of the core-holding mechanism. Fig. 2 is a side elevational view of the baling apparatus in position to receive a bat from an appropriate bat - forming mechanism as seen from the left-hand side. Fig. 3 is a detail view of the core upon which the bale is wound. Fig. 4 is a front elevational view, partly in section, of my improved bale-forming mechanism. Fig. 5 is a side elevational view of the mechanism as seen from the right-hand side of the machine. Fig. 6 is a similar view showing the parts in a different position. Fig. 7 is a front elevational view of the brake mechanism appearing at the right-hand side of the baling apparatus. Fig. 8 is a top plan view, partly in horizontal section. Fig. 9 is a sectional view on line 9 9, Fig. 4. Fig. 10 is a sectional view on line 10 10, Fig. 8.

This invention relates to a new and useful improvement in an apparatus for forming round bales of cotton, the object being to construct a device of the character described so that proper tension will be exerted upon the bat entering into the construction of the bale, the completed bale having a relatively loose center, the layers forming the bale being more compact as they approach the periphery.

My invention consists in the construction, arrangement, and combination of the several parts, all as will hereinafter be described, and afterward pointed out in the claims.

In the drawings in Fig. 1 I have illustrated a condenser and bat - forming mechanism, shown, and described in the claims, in an application filed by me November 13, 1901, Serial No. 82,130. I do not claim in this application any of the details of said condenser and bat-forming mechanism. However, in order that the parts shown in Fig. 1 may be identified I will state that the cotton to be baled comes from the gin through a conduit-pipe 1 and passes over a condenser-cylinder 2. The cotton is doffed from this cylinder by means of rolls 3, which expel the air partially therefrom and form a limp bat which is received in a chamber 4, where the bat accumulates and is supplied to the bat-forming mechanism as required. In the bottom of chamber 4 is an endless belt 5, which delivers the cotton to a picker-wheel 6. The surplus cotton lifted by the picker-wheel is knocked back into the chamber 4 by means of fingers 7, arranged in an appropriate cylinder, which are projected in the manner shown and described in my former application. The cotton carried over by the picker-wheel passes under a curtain-wall 8 and is acted upon by a combing-cylinder 9, which also acts as a fan to generate a blast of air which is forced through the cotton. The cotton passes over a grill 10 and into a bat-forming chamber 11 in the lower portion of which is a movable bottom in the form of a cylinder 12. The bat is formed by pressure-rollers 13 and 14, which expel the air therefrom and deliver the bat to an apron 15. From apron 15 the bat passes between rollers, where it receives its final pressure, and the air is expelled therefrom by this final pressure, after which it is delivered onto the core, where it is wound to form the round bale. The rollers which impart the final pressure to the bat are indicated at 101 and 102, the roller 101 being mounted in yielding bearings (see Fig. 10) and the roller 102 being mounted in fixed bearings and forming, in addition to one of the final pressure-rollers, a supporting-roller for the bale.

The bale - forming mechanism is driven through the medium of power applied to a shaft 105. (See Fig. 4.) This shaft 105 carries a pinion 106, which meshes with pinions 107 and 108, (see Fig. 2,) the former being conjoined to the roller 102, the latter being conjoined to a companion supporting-roller 102ª. The shaft of roller 102 has mounted upon it another pinion 109, (see Figs. 8 and 10,) with which meshes a pinion 110, arranged upon the end of the final pressure-roller 101.

111 indicates a yoke loosely mounted upon the shaft of roller 102, (see Fig. 2,) said yoke carrying transmitting-gear 112, which is designed to mesh with the gear 107 at all times. A link 113 connects this yoke with a vertically-movable frame 114, said frame having mounted therein a roller 115, upon the end of whose axle is a gear 116, designed to mesh at all times with the transmitting-gear 112. This frame 114 is composed of a top cross-connecting member and two vertically-disposed legs 117, which are fitted in suitable guideways in the side frames of the bale-press. These legs 117 are provided with racks on one side edge with which mesh pinions 118. These pinions are keyed to a shaft 119, so as to relieve as far as possible the vertically-movable top-roll-carrying frame of all torsional or twisting strains which would tend to cause the vertical legs thereof to bind in their ways, and in order to back up the rack-legs opposite the pinions 118 I employ rollers 120. These rollers 120 are mounted on a shaft 121, which shaft is arranged in suitable bearings, and one end of said shaft is extended to afford bearings for reducing-gearing employed for raising or lowering the vertically-movable frame and its carried roller.

The operation of this baling-press is as follows: The bat, from which has been pressed practically all air, passing between the rollers 101 and 102, has its end wound upon a bale-core 122, whose construction is best seen in Fig. 3. This bale-core is composed of two tapered portions having heads 123 fitting against shoulders formed on their outer or enlarged ends. One of these core-sections is made hollow for the reception of a stem or rod secured to the other of said sections, means being provided for securing this rod in position in the hollow section, whereby a bale-core of spool form is produced, the several members thereof being separable in order that the core may be readily removed from the bale. The supporting-rollers 102 and 102$^a$ have conjoined to them flanges of greater diameter than said rollers, on which flanges 124 are received the projecting ends of the bale-core, said projecting ends resting upon the flanges 124 of the rollers 102 and 102$^a$, whereby the core is supported in position at a point between said rollers. (See Fig. 1.) The bat entering between rollers 101 and 102 has its end wound upon the core, and through the mechanism hereinbefore described the rollers 102 and 102$^a$ are rotated in the same direction, so that the bat is wound upon the core, the core being rotated faster than the rollers, so as to place a slight tension on the bat, the first one or two layers of said bat not being tightly wound, but being comparatively loose, until the top roller 115 is reached by the bale of gradually-increasing size. When this roller is reached, an initial pressure is exerted upon the nucleus of the bale, which pressure, however, is at first extremely slight, because of the fact that the vertically-movable frame in which the roller 115 is carried is supported by the springs under compression, which springs counterbalance the weight of the vertically-movable frame, but are gradually relieved as said frame is moved upwardly by the increasing diameter of the bale, and consequently the weight of said frame is gradually applied in the form of pressure through the roller 115 onto the bale until the springs referred to are fully relieved. The construction for accomplishing this is shown in Figs. 1 and 4 and consists of a bottom cross-bar 125 between the lower ends of the rack-legs, said cross-bar being preferably I-shaped in cross-section. This bar is designed to rest upon a stirrup-frame 126, composed of cross bars and rods, the upper ends of the latter extending through openings in the base-casting of the bale-press frame and being encircled by springs 127, interposed between the base-casting and an adjustable spring-follower 128 on the upper ends of said rods.

From the above it will be seen that the bale of gradually-increasing size has had applied to it a gradually-increasing pressure which up to this point amounts to the weight of the vertically-movable frame and its associate parts. In this upward movement the frame referred to has carried with it a projection, preferably in the form of a roller 129, (see Figs. 5, 6, and 7,) which projection when the frame was in its lowermost position was located between two parallel members 130 and 131 of a rocking frame pivoted upon a rocking shaft 132, arranged at the side of the bale-press frame. The member 130 of this rocking frame preferably extends upwardly in the form of a handle and is provided with a weight 133. 134 indicates a short rock-arm projecting from the rock-shaft 132, to which is pivotally connected a curved link 135, the other end of said link having connected to it a band 136, which band forms an element of a band-brake, the brake-wheel being indicated at 137. The opposite end of this band is connected to a spring-follower 138, mounted in a suitable frame 139 and designed to compress a spring 140 in advance thereof when the shaft 132 is rocked.

As stated before, the roller 129 when the vertically-movable frame was in its lowermost position was located between the parallel members of the rocking frame, as shown in Fig. 6. As the bale increases in size and said frame is raised the weight of the vertically-movable frame and its carried parts is exerted upon the bale, and about this time the roller 129 is approaching the upper end of its way. As soon as the roller occupies a position which will permit the curved lateral member 131$^a$ of the rocking frame to pass thereunder the weighted rocking frame, by reason of the weight 133 being located to one side (the left) of the pivotal point (the rock-arm 132) said rocking frame will swing to the left and cause the short rock-arm 134, through its link, to draw the band tight upon its wheel, compressing the spring 140 by such action. The rocking frame, however, will not immediately drop to the position shown in Fig. 5, but will approach said position gradually, and during this approach a gradually-increasing resistance is being offered to the rotation of the wheel 137. The bandbrake wheel 137, as shown in Fig. 8, is geared to one of the pinions 118 in mesh with the rack-legs of the vertically-movable frame, and consequently as said frame rises the band-brake wheel is caused to rotate, and the gradually-increasing resistance put upon this brake-wheel will proportionately offer a gradually-increasing resistance to the elevation of the vertically-movable frame. The gearing shown in Fig. 8 is such that the slow movement of the vertically-movable frame causes the brake-wheel to rotate at a comparatively rapid speed, and consequently resistance applied to the brake-wheel will be multiplied proportionately to any advance in an upward direction of the vertically-movable frame. This gearing (shown in Fig. 8) consists of a gear 141, conjoined to the pinion 118 and in mesh with a pinion 142, loosely mounted upon the shaft 121, to which latter pinion is pinned a gear 143, meshing with a pinion 144, loosely mounted upon the shaft 119. A gear 145 is pinned to this pinion 144 and rotates therewith and meshes with a pinion 146, loosely mounted upon the shaft 121 and pinned or conjoined to the brake-wheel 137. As the bale reaches desired proportions the bat-forming mechanism is thrown out of action, after which the bat is severed in proximity to the bale. The covering is now fed around the bale by running the press, and the bale is ready to be removed.

To relieve the bale of the pressure from roller 115, handle 130 is first raised to an upright position. This relieves the brake-wheel of the pressure of the brake-band. Then lever 147 (see Fig. 8) is manipulated. This lever carries an eccentric on its lower end, which eccentric is mounted in suitable bearings, said eccentric affording a bearing for a shaft, upon one end of which is arranged a friction-roll 149 and upon the other end of which is arranged a pulley 150, belted to a driving-pulley on a counter-shaft. (Not shown.) The friction-driver 149 is designed to engage either the hub or rim portions of the brake-wheel 137, depending upon the direction of movement of the lever 147, and when the lever is manipulated in the proper direction the brake-wheel is caused to rotate, and, through the gearing above described, the pinions 118 cause the vertically-movable frame to be elevated, so as to give free access to the bale which has been formed. The cores may now be removed, if desired.

While the vertically-movable frame is elevated a new core is placed in position, and in order to do this conveniently and expeditiously I arrange bifurcated carrying-arms 152 on the shaft or roller 115. (See Fig. 1ª.) These bifurcated arms support the ends of a core, said arms being held in an upward position by means of hooked rock-arms 153, mounted upon a rock-shaft 154, journaled in suitable bearings upon the top cross-piece of the vertically-movable frame. A handle 155 is connected to this rock-shaft, and when said handle is raised and the arms 152 released it follows that the core will swing down into position above and between the rollers 102 and 102ª. The bifurcated ends of arms 152 are slightly yielding and embrace the core, so as to hold it in position until it is ready to be delivered onto the rollers 102 and 102ª. After the core is introduced in place the arms 152 are brought back and caught by the hooked ends of the rock-arms 153, and the vertically-movable frame can now be lowered into proper position to start a new bale. However, before the frame reaches its lowermost position the weighted lever 130 must be raised so as to register the slot of the rocking frame of which it forms a part with the roller 129. It follows that the elevation of this weighted rocking frame releases the brake mechanism and removes the resistance from the vertically-movable frame, so that its descent is rendered comparatively easy. To facilitate the descent of this frame, the lever 147 is preferably manipulated in the opposite direction, so as to cause the brake-wheel to drive the vertically-movable frame downwardly until the roller 115 reaches its proper position and the weight of said frame is supported by the springs 127.

The cotton passing over the condenser-cylinder and through the bat-forming mechanism before reaching the baling device is in the form of a compact bat of uniform thickness, as described in my companion application referred to, from which air has been pressed between the final pressure-rollers 101 and 102, which practically press all air from the bat. The bat emanating from between these rollers is caused to follow the roller 102 until it reaches the core upon which it is wound, so that the bat lies in a quiescent state on the surface of roller 102 until it is wound upon the core. Thus nothing tends to disturb the bat as it issues from these final pressure-rollers until the time it is wound upon the core.

The bale-forming mechanism is of such a character that this bat at the center of the bale is not stretched or drawn tight; but by the gradual application of pressure the convolutions of the bale are tightly pressed inward, and consequently the bale is more tightly wound as it increases in diameter. The instrumentalities for accomplishing this relieve the counterbalancing-springs for the vertically-movable frame, which enables the weight of said frame to be carried by the superimposed pressure-roller 115, and after the springs have been relieved the brake resistance is applied by retarding the upward movement of the frame carrying the superimposed pressure-roller, until finally as the bale approaches the desired diameter it is subjected to the greatest pressure. There is little liability of air getting between the layers of the bat forming the bale, because, as stated before, the bat lies in a quiescent state on the roller 102 until it is taken up by the core and is then directly wound into a bale. However, in the event that air should get under a layer the superimposed roller 115 will by the pressure exerted therethrough upon the bale force the air out of the bale, so that the resultant bale is extremely compact and solid.

When the bale is formed, the bat is severed, the bale is covered, then the lever 130 is raised, and then by manipulating a lever the vertically-movable frame is elevated to enable the removal of the finished bale. The bale is now removed and a new core or spool mechanically dropped into position, after which the brake-resistance devices are restored to their normal position and the vertically-movable frame caused to descend, ready for the formation of another bale.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In an apparatus of the character described, the combination with a bat-forming mechanism, of bat-pressing rollers, a companion roller forming, with one of said bat-pressing rollers, means for supporting a bale, a bale-pressing roller, a frame in which said roller is mounted, means for driving said roller in its different vertical positions, a brake, and means for automatically operating the same upon elevation of said frame above a predetermined level; substantially as described.

2. In an apparatus of the character described, the combination with supporting-rollers, of a bale-pressing roller, a frame in which said roller is mounted, means for driving said roller in its different vertical positions, a brake, and means for automatically operating the same upon elevation of said frame above a predetermined level; substantially as described.

3. In an apparatus of the character described, the combination with supporting-rollers, of a bale-pressing roller, a frame in which said pressing-roller is mounted, and counterbalancing-springs for relieving the bale of the weight of the frame when said roller is in its lowermost position; and said roller is sustained by said springs above, and free from, said bale during the initial formation thereof; substantially as described.

4. In an apparatus of the character described, the combination with bale-supporting rollers, of a bale-pressing roller, a vertically-movable frame in which said pressing-roller is mounted, a cross-bar carried by said frame, and spring-supported yokes coöperating with said cross-bar; substantially as described.

5. In an apparatus of the character described, the combination with bale-supporting rollers, of a bale-pressing roller, a vertically-movable frame in which said pressing-roller is mounted, means for counterbalancing said frame when in its lowermost position, said counterbalancing means being gradually relieved as the frame and pressing-roller rise, and resistance devices which are thrown into operation when the counterbalancing means are rendered inoperative; substantially as described.

6. In an apparatus of the character described, the combination with supporting-rollers, of a bale-pressing roller, a vertically-movable rack-frame in which said pressing-roller is mounted, a pinion meshing with said rack-frame, a brake-wheel driven by said pinion, and a brake mechanism which is thrown into action automatically when the frame rises a predetermined distance; substantially as described.

7. In an apparatus of the character described, the combination with supporting-rollers, of a bale-pressing roller, a vertically-movable rack-frame in which said pressing-roller is mounted, a pinion in mesh with said rack-frame, a brake-wheel driven by said pinion, a weighted rocking frame which is thrown into action when the rack-frame reaches a predetermined height, and a brake-band connected to and operated by said weighted rocking frame; substantially as described.

8. In an apparatus of the character described, the combination with supporting-rollers, of a bale-pressing roller, a vertically-movable rack-frame in which said pressing-roller is mounted, a pinion in mesh with said rack-frame for driving a brake-wheel, a weighted rocking frame having connected thereto a brake-band coöperating with said brake-wheel, and a friction driving mechanism for said brake-wheel whereby the rack-frame may be raised and lowered mechanically; substantially as described.

9. In an apparatus of the character described, the combination with supporting-rollers, of a bale-pressing roller, a vertically-movable frame in which said pressing-roller is mounted, a brake-wheel which is driven by the movement of said frame, a band for said wheel, resilient means for holding one end of said band, a link to which the other end of said band is connected, a rocking frame for actuating said link, a weight arranged to one side of said rocking frame, and means on the vertically-movable frame coöperating with said link-frame to release the same when the vertically-movable frame rises a predetermined distance; substantially as described.

10. In an apparatus of the character described, the combination with a core on which the bale is wound, supporting-rollers geared together, a pressing-roller, a compensating mechanism which partly sustains the pressing-roller when it is at its lowest position and permits the full weight of the roller to act on the bale when said roller is raised a certain distance, and a brake mechanism for resisting the further upward movement of said pressing-roller; substantially as described.

11. In an apparatus of the character described, the combination with a core on which the bale is wound, supporting-rollers geared together, a superimposed pressing-roller, a vertically-movable frame in which said roller is mounted, a counterbalancing mechanism compensating for the major part of the weight of the frame and its carried roller when said roller is at its lowest position, said mechanism permitting the weight of the roller and its frame to act on the bale when the roller is raised a certain distance, and means which are automatically thrown into action when said roller becomes relieved to resist a continued upward movement of the pressing-roller; substantially as described.

12. In an apparatus of the character described, the combination with bale-supporting rollers having flanges at their ends, of a core which is supported by the flanges of said supporting-rollers; substantially as described.

13. In an apparatus of the character described, the combination with bale-supporting rollers having flanges of increased diameter at their ends, of a core formed with flanges at its ends, the core being supported and rotated by said roller-flanges; substantially as described.

14. In an apparatus of the character described, the combination with bale-supporting rollers, of a core composed of tapered sections provided with head-flanges for coöperating with the supporting-rollers; substantially as described.

15. In an apparatus of the character described, the combination with a pressing-roller and its frame, of swinging arms for holding an empty core in position, and means for releasing said arms to permit the empty core to fall into position under the pressing-roller; substantially as described.

16. In an apparatus of the character described, the combination with a bale-forming mechanism, of a device for holding an empty core, and means for tripping said device to enable the empty core to move into position; substantially as described.

17. In an apparatus of the character described, the combination with a pressing-roller and its frame, of bifurcated arms loosely mounted on the axle of said pressing-roller, a rock-shaft mounted in the frame and provided with hooked arms for engaging and holding said swinging arms in an elevated position, and a core arranged in the bifurcations of said swinging arms; substantially as described.

18. In an apparatus of the character described, the combination with bale-supporting rollers having flanges of greater diameter remote from their ends, of a core having projecting upper portions resting upon said flanges of greater diameter, and flanges on the core which are received in the spaces between the ends of the supporting-rollers and their conjoined flanges of greater diameter, whereby the core is rotated at a greater speed than said rollers; substantially as described.

19. In an apparatus of the character described, the combination with rollers 102 and 102$^a$ having conjoined flanges 124 of greater diameter spaced upon their ends, of a core supported upon and rotated by said flanges 124 at a greater peripheral speed than said supporting-rollers, and means for holding said core in position against longitudinal displacement; substantially as described.

20. In an apparatus of the character described, pressing-rollers, a core, bat-feeding means, and means for rotating the core faster than said pressing-rollers; substantially as described.

21. In an apparatus of the character described, pressing-rollers, a divisible core, bat-feeding means, and means for rotating the core faster than said pressing-rollers; substantially as described.

22. In an apparatus of the character described, pressing-rollers, a core, bat-feeding means, and means for rotating the core faster than said pressing-rollers during the initial formation of a bale; substantially as described.

23. In an apparatus of the character described, pressing-rollers, a divisible core, bat-feeding means, and means for rotating the core faster than said pressing-rollers during the initial formation of a bale; substantially as described.

24. In an apparatus of the character described, pressing-rollers, a coned core, bat-feeding means, and means for rotating the core faster than said pressing-rollers; substantially as described.

25. In an apparatus of the character described, pressing-rollers, a divisible coned core, bat-feeding means, and means for rotating the core faster than said pressing-rollers; substantially as described.

26. In an apparatus of the character described, pressing-rollers, an oppositely-coned core, bat-feeding means, and means for rotating the core faster than said pressing-rollers; substantially as described.

27. In an apparatus of the character described, pressing-rollers, a divisible, oppositely-coned core, bat-feeding means, and means for rotating the core faster than said pressing-rollers; substantially as described.

28. In an apparatus of the character described, a core-sustaining means adapted to support and rotate a core in proximity to the compressing-roller but free from contact therewith during the initial winding of a bale; in combination with baling means and means thereon for supporting said core-sustaing means; substantially as described.

29. In an apparatus of the character described, a core-sustaining means adapted to retain the core during initial winding of a bale and to automatically release said core after such initial winding, in combination with baling means and means thereon for supporting said core-sustaining means; substantially as described.

30. In an apparatus of the character described, means for supporting and rotating a core free from contact with all of the compression-rollers during the initial winding of a bale thereon, in combination with baling means and means thereon for supporting said core-sustaining means; substantially as described.

31. In a cotton-baling apparatus, compression-rollers, means for increasing the pressure of said compressing-rollers from zero to a maximum during the formation of a bale, i. e., from the initial winding to the conclusion of the winding thereof; substantially as described.

32. In a cotton-baling apparatus, compression-rollers, means for so regulating the relation of the said compressing-rollers as to produce a minimum pressure only after the initial formation of a bale and for increasing the pressure thereon to a predetermined point as the bale increases in size; substantially as described.

33. In a cotton-baling apparatus, compression-rollers, core-supporting means, and means for rotating said core faster than the said compressing-rollers during the initial winding of the bale; substantially as described.

34. In a cotton-baling apparatus, compression-rollers, means for supporting and rotating a core free from a movable compression-roller during the initial winding of a bale thereon; substantially as described.

35. In a cotton-baling apparatus, compression-rollers, means for supporting and rotating a core away from any of the said compressing-rollers during the initial winding of a bale thereon; substantially as described.

In testimony whereof I hereunto affix my signature, in the presence of two witnesses, this 16th day of June, 1902.

JOHN R. FORDYCE.

Witnesses:
GEORGE BAKEWELL,
LENORE J. WILSON.